United States Patent
Iwai et al.

(10) Patent No.: US 9,882,189 B2
(45) Date of Patent: Jan. 30, 2018

(54) SEPARATOR FOR NONAQUEOUS ELECTROLYTE BATTERY, AND NONAQUEOUS ELECTROLYTE BATTERY

(71) Applicant: TEIJIN LIMITED, Osaka-shi, Osaka (JP)

(72) Inventors: Ayumi Iwai, Yamaguchi (JP); Satoshi Nishikawa, Yamaguchi (JP); Takashi Yoshitomi, Yamaguchi (JP)

(73) Assignee: TEIJIN LIMITED, Osaka (JP)

( * ) Notice: Subject to any disclaimer, the term of this patent is extended or adjusted under 35 U.S.C. 154(b) by 320 days.

(21) Appl. No.: 14/413,522

(22) PCT Filed: Jul. 30, 2013

(86) PCT No.: PCT/JP2013/070539
§ 371 (c)(1),
(2) Date: Jan. 8, 2015

(87) PCT Pub. No.: WO2014/021291
PCT Pub. Date: Feb. 6, 2014

(65) Prior Publication Data
US 2015/0179997 A1 Jun. 25, 2015

(30) Foreign Application Priority Data
Jul. 30, 2012 (JP) .................. 2012-168986

(51) Int. Cl.
*H01M 2/16* (2006.01)
*H01M 10/052* (2010.01)

(52) U.S. Cl.
CPC .......... *H01M 2/168* (2013.01); *H01M 2/1653* (2013.01); *H01M 2/1686* (2013.01); *H01M 10/052* (2013.01)

(58) Field of Classification Search
CPC ....... H01M 2/16; H01M 2/168; H01M 2/1686
See application file for complete search history.

(56) References Cited

U.S. PATENT DOCUMENTS

| 2002/0001753 | A1* | 1/2002 | Pekala | H01M 2/162 |
| | | | | 429/249 |
| 2004/0053122 | A1* | 3/2004 | Sugiyama | H01M 2/1653 |
| | | | | 429/144 |
| 2011/0111297 | A1 | 5/2011 | Sato et al. | |
| 2013/0089770 | A1 | 4/2013 | Nishikawa | |

FOREIGN PATENT DOCUMENTS

| CN | 103155219 A | 6/2013 |
| JP | 4127989 B2 | 7/2008 |
| JP | 2010-245028 A | 10/2010 |
| JP | 2011-100694 A | 5/2011 |
| KR | 1020040025572 A | 3/2004 |
| KR | 1020060101541 A | 9/2006 |
| WO | 2013/058368 A1 | 4/2013 |
| WO | 2013/058369 A1 | 4/2013 |

OTHER PUBLICATIONS

Xiaosong Huang, "Separarator technologies for lithium-ion batteries", available online:Dec. 30, 2010 p. 8/35.*
International Search Report for PCT/JP2013/070539 dated Sep. 17, 2013 [PCT/ISA/210].

* cited by examiner

*Primary Examiner* — Sarah A Slifka
(74) *Attorney, Agent, or Firm* — Sughrue Mion, PLLC

(57) ABSTRACT

Provided is a separator for a nonaqueous electrolyte battery, which includes a porous substrate and an adhesive porous layer that is provided on at least one side of the porous substrate and contains an adhesive resin. The separator has a pore size distribution such that, as measured by a pore size distribution measurement test, the pore size at the maximum value of the maximum peak is within a range of 0.02 μm to 0.1 μm, and the pore size distribution range value $\epsilon$ defined as follows is 0.4 or less. The pore size distribution range value $\epsilon$ herein is a value calculated by the following equation from pore sizes D90, D10, and D50 corresponding to cumulative pore size distributions of 90%, 10%, and 50%, respectively:

pore size distribution range value $\epsilon = (D90 - D10)/D50$.

12 Claims, No Drawings

SEPARATOR FOR NONAQUEOUS ELECTROLYTE BATTERY, AND NONAQUEOUS ELECTROLYTE BATTERY

CROSS REFERENCE TO RELATED APPLICATIONS

This application is a National Stage of International Application No. PCT/JP2013/070539 filed Jul. 30, 2013 (claiming priority based on Japanese Patent Application No. 2012-168986 filed Jul. 30, 2012), the contents of which are incorporated herein by reference in their entirety.

TECHNICAL FIELD

The present invention relates to a separator for a nonaqueous electrolyte battery and also to a nonaqueous electrolyte battery.

BACKGROUND ART

Nonaqueous electrolyte batteries, such as lithium ion secondary batteries, have been widely used as power sources for portable electronic devices such as laptop computers, mobile phones, digital cameras, and camcorders. Further, these batteries are characterized by having high energy density, and thus their application to automobiles and the like has also been studied in recent years.

With the reduction in size and weight of portable electronic devices, the outer casing of a nonaqueous electrolyte battery has been simplified. As outer casings, battery cans made of stainless steel were originally used, and then battery cans formed of aluminum cans have been developed. Further, soft pack outer casings formed of aluminum laminate packs have also been developed nowadays. In the case of a soft pack outer casing formed from an aluminum laminate, because the outer casing is soft, a space may be formed between an electrode and a separator during charging and discharging, causing the technical problem of reduced cycle life. In terms of solving this problem, a technique for bonding an electrode and a separator together is important, and a large number of technical proposals have been made.

As one of the proposals, a technique of using a separator including a polyolefin microporous membrane, which is a conventional separator, and a porous layer made of a polyvinylidene fluoride resin (hereinafter sometimes referred to as adhesive porous layer) formed thereon is known (see, e.g., Patent Document 1). When such an adhesive porous layer with an electrolyte contained therein is placed on an electrode and hot-pressed, the electrode and the separator can be well joined together, where the adhesive porous layer can function as an adhesive. Thus, the cycle life of a soft pack battery can be improved.

In addition, in the case where a battery is produced using a conventional metal can outer casing, electrodes and a separator are placed on top of one another and wound to produce a battery element, and the element is enclosed in a metal can outer casing together with an electrolyte, thereby producing a battery. Meanwhile, in the case where a soft pack battery is produced using a separator like the separator of Patent Document 1 mentioned above, a battery element is produced in the same manner as for the battery having a metal can outer casing mentioned above, then enclosed in a soft pack outer casing together with an electrolyte, and finally subjected to a hot-pressing process, thereby producing a battery. Thus, in the case where a separator including an adhesive porous layer as mentioned above is used, it is possible to produce a battery element in the same manner as for the battery having a metal can outer casing mentioned above. This is advantageous in that there is no need to greatly change the production process for conventional batteries having a metal can outer casing.

Against this background, various technical proposals have been made in the past for separators made of a polyolefin microporous membrane and an adhesive porous layer laminated thereon. For example, in terms of achieving both the ensuring of sufficient adhesion and ion permeability, Patent Document 1 presents a new technical proposal focusing on the porous structure and thickness of a polyvinylidene fluoride resin layer.

PRIOR ART DOCUMENTS

Patent Documents

Patent Document 1: Japanese Patent No. 4127989

SUMMARY OF THE INVENTION

Problems that the Invention is to Solve

However, in the separator described in Patent Document 1, pores having a pore size of 0.05 to 10 µm are scattered over the surface of the adhesive porous layer. When the surface has such a non-uniform pore structure, in the case where the amount of binder resin in an electrode is reduced, and also the hot-pressing conditions are relaxed, it may be difficult to achieve adhesion to electrodes, ion permeability, and battery cycle characteristics all together.

Against this background, an object of the invention is to provide a separator for a nonaqueous electrolyte battery, which has improved adhesion to electrodes, ion permeability, and cycle characteristics when applied to a battery, as compared to the conventional art. The invention addresses the achievement of the object.

Means for Solving the Problems

In order to solve the problems mentioned above, the invention is configured as follows.

<1> A separator for a nonaqueous electrolyte battery, including a porous substrate and an adhesive porous layer that is provided on at least one side of the porous substrate and contains an adhesive resin, in the pore size distribution of the separator measured by a pore size distribution measurement test, the pore size at the maximum value of the maximum peak being within a range of 0.02 µm to 0.1 µm, the pore size distribution range value $\epsilon$ defined as follows being 0.4 or less:

pore size distribution range value $\epsilon$: a value calculated by the following equation from a pore size D90 corresponding to a cumulative pore size distribution of 90%, a pore size D10 corresponding to a cumulative pore size distribution of 10%, and a pore size D50 corresponding to a cumulative pore size distribution of 50%:

$$\epsilon=(D90-D10)/D50.$$

<2> The separator for a nonaqueous electrolyte battery according to <1>, wherein the difference between the pore size at the maximum value of the maximum peak of the separator and the pore size at the maximum value of the maximum peak in the pore size distribution of the porous substrate measured using the pore size distribution measurement test is 0.04 µm or less.

<3> The separator for a nonaqueous electrolyte battery according to <1> or <2>, wherein the adhesive resin is a polyvinylidene fluoride resin.

<4> The separator for a nonaqueous electrolyte battery according to <3>, wherein the polyvinylidene fluoride resin has a weight average molecular weight of 300,000 or more and 3,000,000 or less.

<5> A nonaqueous electrolyte battery including a positive electrode, a negative electrode, and the separator for a nonaqueous electrolyte battery of any one of <1> to <4> disposed between the positive electrode and the negative electrode, an electromotive force thereof being obtained by lithium doping/dedoping.

Advantage of the Invention

The invention enables the provision of a separator for a nonaqueous electrolyte battery, which has improved adhesion to electrodes, ion permeability, and cycle characteristics when applied to a battery, as compared to the conventional art.

MODE FOR CARRYING OUT THE INVENTION

Hereinafter, the separator for a nonaqueous electrolyte battery of the invention and a nonaqueous electrolyte battery using the same will be described in detail. Incidentally, a numerical range indicated by "to" below means a numerical range including the minimum and the maximum.
<Separator for Nonaqueous Electrolyte Battery>

The separator for a nonaqueous electrolyte battery of the invention (hereinafter sometimes simply referred to as "separator") includes a porous substrate and an adhesive porous layer that is provided on at least one side of the porous substrate and contains an adhesive resin. In the pore size distribution of the separator measured by a pore size distribution measurement test, the pore size $\varphi_S$ at the maximum value of the maximum peak $P_S$ is within a range of 0.02 μm to 0.1 μm, and the pore size distribution range value $\epsilon$ is 0.4 or less.

The pore size distribution range value $\epsilon$ herein refers to, in the pore size distribution of the separator measured by a pore size distribution measurement test, a value calculated by the equation $[\epsilon=(D90-D10)/D50]$ using a pore size $D90$ corresponding to a cumulative pore size distribution of 90%, a pore size $D10$ corresponding to a cumulative pore size distribution of 10%, and a pore size $D50$ corresponding to a cumulative pore size distribution of 50%.

A separator for a nonaqueous electrolyte battery configured as above is excellent in terms of adhesion to electrodes, ion permeability, and cycle characteristics. Therefore, the use of such a separator makes it possible to provide a high-energy-density, high-performance nonaqueous electrolyte battery having an aluminum laminate pack outer casing, which has excellent battery characteristics such as load characteristics and cycle characteristics.

The description "in the pore size distribution of the separator measured by a pore size distribution measurement test, the pore size at the maximum value of the maximum peak being within a range of 0.02 μm to 0.1 μm" herein means that when the distribution of pores of the separator is measured by a pore size distribution measurement test, the pore size $\varphi_S$ at the maximum value of the peak $P_S$, where the number of pores is the greatest in the distribution, is within a range of 0.02 μm to 0.1 μm.

Incidentally, in the case where the separator is made up only of a porous substrate and an adhesive porous layer, the number of pores of the separator is the sum of the number of pores of the porous substrate and the number of pores of the adhesive porous layer.

In addition, "pore size distribution range value $\epsilon$" is an index that shows the width of pore size distribution, and the value is calculated from the equation "$\epsilon=(D90-D10)/D50$." The greater the $\epsilon$, the wider the pore size distribution. Meanwhile, the smaller the $\epsilon$, the sharper the shape of the maximum peak $P_S$ in the pore size distribution of pores of the separator. In the case where $\epsilon=0$, there are no variations in the pore size, indicating a completely uniform state.

In the invention, "a pore size distribution range value $\epsilon$ of 0.4 or less" means that the pore size of pores of the separator does not vary much and has high uniformity.

That is, the above means that in the separator of the invention, the number of pores having a pore size within a range of 0.02 μm to 0.1 μm is the greatest, and the uniformity of pore size is high.

Incidentally, a separator is present between the positive electrode and the negative electrode of a nonaqueous electrolyte battery (hereinafter sometimes simply referred to as "battery") and serves to prevent the electrodes from shorting and allows ions in the electrolyte, such as lithium ion, to permeate smoothly. At this time, in order to suppress a decrease in battery life, ions are required to permeate smoothly without being concentrated on a part of the separator. When the pore size varies in a separator, the permeation of ions tends to be uneven, that is, for example, ions easily permeate in some parts of the separator, while permeation is difficult in other parts. As a result, when the permeation of ions is uneven, the degradation of the separator is accelerated in a part where ions easily permeate, leading to loss of ion permeability, and this may result in loss of the capacity retention of the battery.

Thus, in the invention, the pore size distribution range value $\epsilon$ is to be 0.4 or less. As a result, the uniformity of pore size increases, and the ease of ion permeation becomes uniform. Accordingly, the local degradation of the separator can be suppressed. Therefore, battery capacity retention characteristics in the repeated charging and discharging of a battery (cycle characteristics) can be improved. From such a point of view, the pore size distribution range value $\epsilon$ of the separator is preferably 0.3 or less, more preferably 0.25 or less, and still more preferably 0.2 or less. Incidentally, although the ideal pore size distribution range value $\epsilon$ of the separator is 0, in consideration of the productivity of the separator, $\epsilon$ is preferably 0.05 or more, and more preferably 0.1 or more.

In addition, in the case where the pore size $\varphi_S$ of the separator is large, ion permeability tends to improve. However, in that case, the bonding area between the adhesive porous layer and the electrodes decreases, and thus adhesion between the separator and the electrodes also tends to decrease. On the contrary, in the case where the pore size $\varphi_S$ of the separator is small, although adhesion between the separator and the electrodes improves, ion permeability tends to decrease. That is, there is a trade-off relation between ion permeability and adhesion.

Thus, in the invention, the pore size $\varphi_S$ of the separator is controlled to be within a range of 0.02 μm to 0.1 μm. As a result, ion permeability and adhesion are well-balanced. From such a point of view, the lower limit of the pore size $\varphi_S$ of the separator is preferably 0.025 μm or more, and more preferably 0.03 μm or more. In addition, the upper limit of the pore size $\varphi_S$ of the separator is preferably 0.05 μm or less, and more preferably 0.04 μm or less.

In the invention, the pore size $\varphi_S$ and pore size distribution range value $\epsilon$ of the separator are measured by a pore size distribution measurement test. More specifically, $\varphi_S$ and $\epsilon$ can be determined by a half-dry method (ASTM E1294-89) using Capillary Flow Porometer manufactured by PMI and using perfluoropolyester (trade name: "Galwick") as a test solution.

Incidentally, the pore size $\varphi_S$ and pore size distribution range value $\epsilon$ of the separator can be controlled, for example, by the selection of a porous substrate having a specific pore size and a specific pore size distribution or by the adjustment of the molecular weight of the adhesive resin forming the adhesive porous layer, the composition of the material for forming the adhesive porous layer, the forming conditions, etc.

(Physical Properties of Separator)

In the invention, in terms of enhancing the uniformity of ion permeability, it is preferable that the difference $\Delta\varphi$ between the pore size $\varphi_S$ of the separator and the pore size $\varphi_B$ of the porous substrate ($=|\varphi_S-\varphi_B|$) is 0.04 μm or less.

The pore size $\varphi_B$ of the porous substrate herein is the pore size at the maximum value of the maximum peak $P_B$ in the pore size distribution of the porous substrate measured by a pore size distribution measurement test. The pore size $\varphi_B$ of the porous substrate is also measured by a pore size distribution measurement test in the same manner as for the pore size $\varphi_S$ of the separator mentioned above.

When the difference $\Delta\varphi$ between the pore size $\varphi_S$ of the separator and the pore size $\varphi_B$ of the porous substrate is small, this means that the uniformity of pore size is high through both the porous substrate and the adhesive porous layer. As mentioned above, when ion permeability varies from place to place in the separator, it is likely that a part with high ion permeability is degraded first, for example, causing a decrease in battery cycle characteristics. However, in the invention, because $\Delta\varphi$ is 0.04 μm or less, the uniformity of the ion permeability of the separator can be further enhanced. From such a point of view, $\Delta\varphi$ is more preferably 0.03 μm or less, still more preferably 0.01 μm or less, and particularly preferably 0 μm.

Incidentally, $\Delta\varphi$ can be controlled by the selection of a porous substrate having a specific pore size or by the adjustment of the molecular weight of the adhesive resin forming the adhesive porous layer, for example. In addition, it can also be controlled by the adjustment of the composition of the material for forming the adhesive porous layer, the forming conditions, etc.

In terms of obtaining sufficient battery performance, it is preferable that the separator has a Gurley number within a range of not less than 50 sec/100 cc and not more than 800 sec/100 cc.

In terms of satisfactorily obtaining the advantage of the invention and the dynamic properties of the separator, it is suitable that the separator has a porosity within a range of 30% or more and 60% or less.

In terms of ensuring good ion permeability, it is preferable that the separator has a tortuosity within a range of 1.5 to 2.5. Incidentally, tortuosity is a ratio ($L_P/L_S$) between the pore length $L_P$ through the separator from one side to the other side and the separator thickness $L_S$.

In terms of mechanical strength and energy density, it is preferable that the separator has a thickness of 5 μm to 35 μm.

In terms of ensuring the sufficient load characteristics of a battery, it is preferable that the separator has a membrane resistance within a range of 1 ohm-cm$^2$ to 10 ohm-cm$^2$.

Membrane resistance herein refers to the resistance of the separator as impregnated with an electrolyte, and is measured by an alternating-current method. The above value is a value measured at 20° C. using 1 M LiBF$_4$-propylene carbonate/ethylene carbonate (1/1 weight ratio) as the electrolyte.

[Porous Substrate]

The porous substrate in the invention means a substrate having pores or voids inside.

Examples of such substrates include microporous membranes, porous sheets made of a fibrous material, such as nonwoven fabrics and paper-like sheets, and composite porous sheets including such a microporous membrane or porous sheet as well as one or more other porous layers laminated thereon. Incidentally, the microporous membrane means a membrane having a large number of micropores inside and configured such that the micropores are connected to allow gas or liquid to pass from one side to the other side.

The material forming the porous substrate may be an electrically insulating organic material or inorganic material. In particular, in terms of imparting a shutdown function to the porous substrate, it is preferable to use a thermoplastic resin as the material forming the substrate. A shutdown function herein refers to the following function: upon an increase in battery temperature, the thermoplastic resin melts and closes pores of the porous substrate, thereby blocking the movement of ions to prevent the battery from thermal runaway. As the thermoplastic resin, a thermoplastic resin having a melting point of less than 200° C. is suitable, and polyolefins are particularly preferable.

As a porous substrate using a polyolefin, a polyolefin microporous membrane is preferable. As the polyolefin microporous membrane, it is possible to use a polyolefin microporous membrane that has been applied to conventional separators for nonaqueous electrolyte battery, which has sufficient dynamic properties and ion permeability. Further, in terms of possessing the shutdown function mentioned above, it is preferable that the polyolefin microporous membrane contains polyethylene, and it is preferable that the polyethylene content is 95 mass % or more.

Separately, in terms of providing the porous substrate with heat resistance that prevents the porous substrate from easily breaking when exposed to high temperatures, a polyolefin microporous membrane containing polyethylene and polypropylene is preferable as the material forming the porous substrate. An example of such a polyolefin microporous membrane is a microporous membrane in which both polyethylene and polypropylene are present in one sheet. In terms of achieving both a shutdown function and heat resistance, it is preferable that the microporous membrane contains 95 mass % or more polyethylene and 5 mass % or less polypropylene. In addition, in terms of achieving both a shutdown function and heat resistance, it is also preferable that the polyolefin microporous membrane has a laminated structure including at least two layers, in which one of the two layers contains polyethylene, while the other layer contains polypropylene.

It is preferable that the polyolefin has a weight average molecular weight of 100,000 to 5,000,000. A weight average molecular weight of 100,000 or more makes it easy to ensure sufficient dynamic properties. Meanwhile, a weight average molecular weight of 5,000,000 or less suppresses the deterioration of shutdown characteristics and also facilitates the formation of a substrate.

Such a polyolefin microporous membrane can be produced by the following methods, for example. That is, a method that forms a microporous membrane by successively performing the following steps can be mentioned: (i) a step of extruding a molten polyolefin resin from a T-die to form a sheet, (ii) a step of subjecting the sheet to a crystallization treatment, (iii) a step of stretching the sheet, and (iv) a step of heat-treating the stretched sheet. Alternatively, a method that forms a microporous membrane by successively performing the following steps can also be mentioned, for example: (i) a step of melting a polyolefin resin together with a plasticizer such as liquid paraffin and extruding the melt from a T-die, followed by cooling to form a sheet, (ii) a step of stretching the sheet, (iii) a step of extracting the plasticizer from the sheet, and (iii) a step of heat-treating the sheet.

As a porous sheet made of a fibrous material, it is possible to use a porous sheet made of a fibrous material made of a polyester such as polyethylene terephthalate, a polyolefin such as polyethylene or polypropylene, a heat-resistant polymer such as aromatic polyamide, polyimide, polyethersulfone, polysulfone, polyether ketone, or polyetherimide, etc., or a mixture of these fibrous materials.

A composite porous sheet may be configured to include a microporous membrane or a porous sheet made of a fibrous material as well as a functional layer laminated thereon. The composite porous sheet is preferable in that further functions can be imparted by the functional layer. In terms of imparting heat resistance, for example, the functional layer may be a porous layer made of a heat-resistant resin or a porous layer made of a heat-resistant resin and an inorganic filler. The heat-resistant resin may be one or more kinds of heat-resistant polymers selected from aromatic polyamide, polyimide, polyethersulfone, polysulfone, polyether ketone, and polyetherimide. As the inorganic filler, metal oxides such as alumina and metal hydroxides such as magnesium hydroxide can be preferably used. Incidentally, examples of compositing techniques include a method in which a porous sheet is coated with a functional layer, a method in which they are joined together using an adhesive, and a method in which they are bonded together by thermocompression.

(Physical Properties of Porous Substrate)

In the invention, in terms of adjusting the pore size $\varphi_S$ of the separator to be within the range of the invention, it is preferable that the pore size $\varphi_B$ of the porous substrate is 0.01 μm to 0.1 μm. From such a point of view, the lower limit of the pore size $\varphi_B$ of the porous substrate is preferably 0.02 μm or more, and more preferably 0.025 μm or more. In addition, the upper limit of the pore size $\varphi_B$ of the porous substrate is preferably 0.05 μm or less, and more preferably 0.04 μm or less.

In terms of obtaining excellent dynamic properties and internal resistance, it is preferable that the porous substrate has a thickness within a range of 5 μm to 25 μm.

In terms of preventing short circuits in a battery and obtaining sufficient ion permeability, it is preferable that the porous substrate has a Gurley number (JIS P8117) within a range of 50 sec/100 cc to 800 sec/100 cc.

In terms of improving the production yield, it is preferable that the porous substrate has a puncture resistance of 300 g or more.

[Adhesive Porous Layer]

The adhesive porous layer is provided on at least one side of the porous substrate and contains an adhesive resin. The adhesive porous layer means a porous layer having a large number of micropores inside and configured such that the micropores are connected to allow gas or liquid to pass from one side to the other side.

The adhesive porous layer is provided as the outermost layer(s) of the separator on one side or both sides of the porous substrate. The adhesive porous layer allows for bonding to an electrode. That is, when the separator and an electrode are stacked and hot-pressed, the adhesive porous layer can bond the separator to the electrode. In the case where the separator for a nonaqueous electrolyte battery of the invention has the adhesive porous layer only on one side of the porous substrate, the adhesive porous layer adheres to the positive electrode or the negative electrode. In addition, in the case where the separator for a nonaqueous electrolyte battery of the invention has the adhesive porous layer on both sides of the porous substrate, the adhesive porous layer adheres to both the positive electrode and the negative electrode. When the adhesive porous layer is present on both sides of the porous substrate, both sides of the separator adhere well to both electrodes via the adhesive porous layer. This provides a battery with excellent cycle characteristics and thus is preferable.

(Adhesive Resin)

The adhesive resin contained in the adhesive porous layer is not particularly limited as long as it easily adheres to electrodes. Preferred examples thereof include polyvinylidene fluoride, polyvinylidene fluoride copolymers, styrene-butadiene copolymers, polyvinyl alcohol, homopolymers and copolymers of vinyl nitriles such as acrylonitrile and methacrylonitrile, and polyethers such as polyethylene oxide and polypropylene oxide. Polyvinylidene fluoride and polyvinylidene fluoride copolymers (these are referred to as "polyvinylidene fluoride resin") are particularly preferable. The adhesive porous layer may contain only one kind of adhesive resin, or may also contain two or more kinds.

Examples of polyvinylidene fluoride resins include a homopolymer of vinylidene fluoride (i.e., polyvinylidene fluoride), copolymers of vinylidene fluoride and another copolymerizable monomer, and mixtures thereof. Examples of monomers copolymerizable with vinylidene fluoride include tetrafluoroethylene, hexafluoropropylene, trifluoroethylene, trichloroethylene, and vinyl fluoride. They can be used alone, or it is also possible to use two or more kinds. Such a polyvinylidene fluoride resin can be obtained by emulsion polymerization or suspension polymerization.

It is preferable that the polyvinylidene fluoride resin used in the separator for a nonaqueous electrolyte battery of the invention has a structural unit containing 98 mol % or more vinylidene fluoride. In the case where 98 mol % or more of vinylidene fluoride is present, dynamic properties and heat resistance more sufficient for severe hot-pressing conditions can be ensured.

As a polyvinylidene fluoride resin, one having a weight average molecular weight within a range of 300,000 to 3,000,000 is preferable. When the weight average molecular weight of the polyvinylidene fluoride resin is 300,000 or more, it is easy to control the pore size $\varphi_S$ and pore size distribution range value $\epsilon$ of the separator to be within the above ranges. In addition, the adhesive porous layer is likely to have dynamic properties that can withstand the step of bonding to electrodes, making it easy to obtain sufficient adhesion. From such a point of view, the weight average molecular weight of the polyvinylidene fluoride resin is preferably 500,000 or more, more preferably 600,000 or more, and still more preferably 700,000 or more. When the weight average molecular weight of the polyvinylidene fluoride resin is 3,000,000 or less, the adhesive porous layer has excellent formability. This facilitates excellent crystal formation in the adhesive porous layer, making it easy to obtain a suitable porous structure. From such a point of view, the weight average molecular weight of the polyvinylidene fluoride resin is preferably 2,500,000 or less, and preferably 2,000,000 or less.

(Additive)

Without interfering with the advantage of the invention, the adhesive porous layer may also contain a filler made of an inorganic substance or an organic substance and other additives.

The presence of such a filler in the adhesive porous layer can improve the slidability and heat resistance of the separator. Examples of usable inorganic fillers (fillers made of an inorganic substance) include metal oxides such as alumina and metal hydroxides such as magnesium hydroxide. Examples of usable organic fillers (fillers made of an organic substance) include acrylic resin.

(Physical Properties of Adhesive Porous Layer)

In terms of adhesion to electrodes, ion permeability, and battery load characteristics, it is preferable that the mass of the adhesive resin on the porous substrate is within a range of 0.5 $g/m^2$ or more and 1.5 $g/m^2$ or less on one side. In the case where the adhesive porous layer is formed on both front and back sides, it is preferable that the total mass of the adhesive resin is 1.0 $g/m^2$ or more and 3.0 $g/m^2$ or less.

In particular, in the case where the adhesive porous layer is formed on both sides of the porous substrate, the difference in mass between the front and the back is also important. Specifically, in the case where the adhesive porous layer is formed on the front and back of the porous substrate, it is preferable that the total mass on both sides is 1.0 $g/m^2$ to 3.0 $g/m^2$, and the difference between the mass of the adhesive porous layer on one side and the mass of the adhesive porous layer on the other side is 20% or less of the total mass on both sides. When the difference is more than 20%, this may result in significant curling, interfering with handling or deteriorating cycle characteristics.

In terms of ion permeability, it is preferable that the adhesive porous layer has a structure that is sufficiently porous. Specifically, it is preferable that the difference between the Gurley number of the used porous substrate and the Gurley number of the separator after the formation of an adhesive porous layer is not more than 300 sec/100 cc, more preferably not more than 150 sec/100 cc, and still more preferably not more than 100 sec/100 cc. When the Gurley number difference is not more than 300 sec/100 cc, the inhibition of ion permeation due to the adhesive porous layer being too dense is suppressed, and sufficient battery characteristics are likely to be obtained.

In terms of ensuring adhesion and excellent ion permeability, it is preferable that the thickness of the adhesive porous layer on one side is within a range of 0.5 µm to 5 µm.

In terms of cycle characteristics, it is preferable that the adhesive resin in the adhesive porous layer has a fibril diameter within a range of 10 nm to 1,000 nm.

<Method for Producing Separator for Nonaqueous Electrolyte Battery>

The separator for a nonaqueous electrolyte battery of the invention can be produced, for example, by a method in which a porous substrate is coated thereon with a coating liquid containing an adhesive resin, such as a polyvinylidene fluoride resin, to form a coating layer, and then the resin of the coating layer is solidified, thereby integrally forming an adhesive porous layer on the porous substrate.

The following describes the case where the adhesive porous layer is formed using a polyvinylidene fluoride resin.

An adhesive porous layer using a polyvinylidene fluoride resin as an adhesive resin can be preferably formed by the following wet coating method, for example.

The wet coating method is a film formation method including (i) a step of dissolving a polyvinylidene fluoride resin in a suitable solvent to prepare a coating liquid, (ii) a step of coating a porous substrate with the coating liquid, (iii) a step of immersing the porous substrate in a suitable coagulation liquid to induce phase separation and solidify the polyvinylidene fluoride resin, (iv) a step of washing with water, and (v) a step of drying, thereby forming a porous layer on the porous substrate. The detail of the wet coating method suitable for the invention is as follows.

As a solvent that dissolves a polyvinylidene fluoride resin (hereinafter sometimes referred to as "good solvent") used for the preparation of a coating liquid, it is preferable to use a polar amide solvent such as N-methylpyrrolidone, dimethylacetamide, dimethylformamide, or dimethylformamide.

In terms of forming an excellent porous structure, in addition to the good solvent, it is preferable to mix a phase separation agent that induces phase separation. Examples of phase separation agents include water, methanol, ethanol, propyl alcohol, butyl alcohol, butanediol, ethylene glycol, propylene glycol, and tripropylene glycol. It is preferable that the phase separation agent is added within a range where viscosity suitable for coating can be ensured.

In terms of forming an excellent porous structure, it is preferable that the solvent is a mixed solvent containing 60 mass % or more a good solvent and 40 mass % or less a phase separation agent.

In terms of forming an excellent porous structure, it is preferable that the coating liquid contains the polyvinylidene fluoride resin at a concentration of 3 to 10 mass %.

In the case where a filler or other components are added to the adhesive porous layer, they may be mixed with or dissolved in the coating liquid.

In general, a coagulation liquid contains the good solvent and phase separation agent used for the preparation of a coating liquid and water. In terms of production, it is preferable that the mixing ratio between the good solvent and the phase separation agent is determined according to the mixing ratio in the mixed solvent used for dissolving a polyvinylidene fluoride resin. In terms of the formation of a porous structure and productivity, it is suitable that the concentration of water is 40 mass % to 90 mass %.

The coating of a porous substrate with the coating liquid may be performed using a conventional coating technique, such as a Mayer bar, a die coater, a reverse roll coater, or a gravure coater. In the case where an adhesive porous layer is formed on both sides of the porous substrate, in terms of productivity, it is preferable that both sides of the substrate are simultaneously coated with the coating liquid.

In addition to the wet coating method mentioned above, the adhesive porous layer can be produced by a dry coating method. A dry coating method herein is a method in which, for example, a porous substrate is coated with a coating liquid containing a polyvinylidene fluoride resin and a solvent, and then the resulting coating layer is dried to volatilize the solvent away, thereby giving a porous layer. However, as compared with the wet coating method, the dry coating method tends to give a dense coating layer. Accordingly, the wet coating method is more preferable in terms of obtaining an excellent porous structure.

The separator for a nonaqueous electrolyte battery of the invention can also be produced by a method in which an adhesive porous layer is formed as an independent sheet, then the adhesive porous layer is placed on a porous substrate, and they are composited by thermocompression bonding or using an adhesive. The method for producing an adhesive porous layer as an independent sheet may be a method in which a release sheet is coated thereon with a coating liquid containing a resin, then an adhesive porous layer is formed by the wet coating method or dry coating method mentioned above, and the adhesive porous layer is peeled off from the release sheet.

<Nonaqueous Electrolyte Battery>

The nonaqueous electrolyte battery of the invention includes a positive electrode, a negative electrode, and the separator for a nonaqueous electrolyte battery mentioned above disposed between the positive electrode and the negative electrode, and the electromotive force of the battery is obtained by lithium doping/dedoping. Incidentally, doping means occlusion, support, adsorption, or intercalation, and refers to the phenomenon that lithium ions enter the active material of an electrode such as a positive electrode.

The nonaqueous electrolyte battery is configured such that a battery element, which includes an electrolyte-impregnated structure having the negative electrode and the positive electrode facing each other via the separator, is enclosed in an outer casing material. The nonaqueous electrolyte battery of the invention is suitable for a nonaqueous electrolyte secondary battery, particularly a lithium ion secondary battery.

The nonaqueous electrolyte battery of the invention includes, as a separator, the separator for a nonaqueous electrolyte battery of the invention mentioned above, and thus has excellent adhesion between the electrodes and the separator. At the same time, the yield of the production process is high, and electrolyte retention is also excellent. Accordingly, the nonaqueous electrolyte battery of the invention develops stable cycle characteristics.

The positive electrode may be configured such that an active material layer containing a positive electrode active material and a binder resin is formed on a collector. The active material layer may further contain an electrically conductive auxiliary.

Examples of positive electrode active materials include lithium-containing transition metal oxides. Specific examples thereof include $LiCoO_2$, $LiNiO_2$, $LiMn_{1/2}Ni_{1/2}O_2$, $LiCo_{1/3}Mn_{1/3}Ni_{1/3}O_2$, $LiMn_2O_4$, $LiFePO_4$, $LiCo_{1/2}Ni_{1/2}O_2$, and $LiAl_{1/4}Ni_{3/4}O_2$.

Examples of binder resins include polyvinylidene fluoride resins and styrene-butadiene copolymers.

Examples of electrically conductive auxiliaries include carbon materials such as acetylene black, ketjen black, and graphite powder.

Examples of collectors include aluminum foils, titanium foils, and stainless steel foils having a thickness of 5 μm to 20 μm.

In the nonaqueous electrolyte battery of the invention, in the case where the separator includes an adhesive porous layer containing a polyvinylidene fluoride resin, and the adhesive porous layer is disposed on the positive electrode side, because the polyvinylidene fluoride resin has excellent oxidation resistance, a positive electrode active material that can be operated at a high voltage of 4.2 V or more, such as $LiMn_{1/2}Ni_{1/2}O_2$ or $LiCo_{1/3}Mn_{1/3}Ni_{1/3}O_2$, can be easily applied; thus, this is advantageous.

The negative electrode may be configured such that an active material layer containing a negative electrode active material and a binder resin is formed on a collector. The active material layer may further contain an electrically conductive auxiliary.

Examples of negative electrode active materials include materials capable of electrochemically occluding lithium. Specific examples thereof include carbon materials, silicon, tin, aluminum, and Wood's alloy.

Examples of binder resins include polyvinylidene fluoride resins and styrene-butadiene copolymers.

Examples of electrically conductive auxiliaries include carbon materials such as acetylene black, ketjen black, and graphite powder.

Examples of collectors include copper foils, nickel foils, and stainless steel foils having a thickness of 5 μm to 20 μm.

In addition, instead of such a negative electrode, a metal lithium foil may also be used as the negative electrode.

The electrolyte is a solution obtained by dissolving a lithium salt in a nonaqueous solvent.

Examples of lithium salts include $LiPF_6$, $LiBF_4$, and $LiClO_4$.

Examples of nonaqueous solvents include cyclic carbonates such as ethylene carbonate, propylene carbonate, fluoroethylene carbonate, and difluoroethylene carbonate; linear carbonates such as dimethyl carbonate, diethyl carbonate, ethyl methyl carbonate, and fluorine substitutions thereof; and cyclic esters such as γ-butyrolactone and γ-valerolactone. They may be used alone or as a mixture.

As the electrolyte, one obtained by mixing a cyclic carbonate and a linear carbonate in a mass ratio (cyclic carbonate/linear carbonate) of 20/80 to 40/60 and dissolving a lithium salt therein at 0.5 M to 1.5 M is preferable.

Examples of outer casing materials include metal cans and packs formed from an aluminum laminate film.

The shape of batteries may be prismatic, cylindrical, coin-type, etc., and the separator for a nonaqueous electrolyte battery of the invention is suitable for any shape.

EXAMPLES

Hereinafter, the invention will be described in further detail with reference to examples. However, within the gist thereof, the invention is not limited to the following examples.

[Measurement Methods]

Separators and lithium ion secondary batteries produced in the following examples and comparative examples were subjected to the following measurements and evaluations.

(Pore Size, Pore Size Distribution)

The pore size and pore size distribution of a separator and a porous substrate were measured by a pore size distribution measurement test method [half-dry method (ASTM E1294-89)] using a Perm Porometer porous material automatic micropore size distribution measurement system [Capillary Flow Porometer] manufactured by PMI. Incidentally, perfluoropolyester (trade name: "Galwick") was used as a test solution. In the obtained pore size distributions, the pore sizes $\varphi_S$ and $\varphi_B$ at the maximum values of the peaks $P_S$ and $P_B$, where the relative numbers were the greatest, were measured, as well as the pore size distribution range value ϵ of the separator. The pore size distribution range value ϵ was calculated by the following equation from pore sizes D90, D10, and D50 corresponding to cumulative pore size distributions of 90%, 10%, and 50%, respectively:

$$\epsilon = (D90 - D10)/D50.$$

(Thickness)

Measurement was performed using a contact thickness meter (LITEMATIC manufactured by Mitutoyo Corporation). A cylindrical terminal 5 mm in diameter was used as a measuring terminal, and it was adjusted to apply a load of 7 g during the measurement.

(Gurley Number)

Measurement was performed in accordance with JIS P8117 using a Gurley densometer (G-B2C manufactured by Toyo Seiki).

Example 1

As a polyvinylidene fluoride resin, a copolymer of vinylidene fluoride/hexafluoropropylene (=98.9/1.1 mol %) having a weight average molecular weight of 1,950,000 was used. The polyvinylidene fluoride resin was dissolved at a concentration of 5 mass % in a mixed solvent of dimethylacetamide/tripropylene glycol (=7/3 mass ratio) to prepare a coating liquid. Both sides of a polyethylene microporous membrane having a thickness of 9 μm, a Gurley number of 160 sec/100 cc, a porosity of 43% (porous substrate 1) were coated with the same amount of the coating liquid, followed by immersion in a coagulation liquid (at 40° C.) containing water/dimethylacetamide/tripropylene glycol (=57/30/13 mass ratio) to cause solidification. It was then washed with water and dried to give a separator for a nonaqueous electrolyte battery, which had an adhesive porous layer made of a polyvinylidene fluoride resin formed on both sides of a polyolefin macroporous membrane.

With respect to this separator, Table 1 shows the results of the measurement of the pore sizes $\varphi_S$ and $\varphi_B$ at the maximum values of the maximum peaks in the pore size distributions of the separator and the porous substrate, as well as their difference $\Delta\varphi$, the pore size distribution range value $\epsilon$, the weight average molecular weight (Mw) of the polyvinylidene fluoride resin (PVdF), the concentration of the phase-separation agent in the coating liquid, the concentration of water in the coagulation liquid, the temperature of the coagulation liquid, and the Gurley number of the separator. Incidentally, the separators of the following examples and comparative examples are also summarized in Table 1.

Example 2

A separator for a nonaqueous electrolyte battery was obtained in the same manner as in Example 1, except that the concentration of the phase-separation agent in the coating liquid, the concentration of water in the coagulation liquid, and the temperature of the coagulation liquid were changed as in Table 1.

Example 3

A separator for a nonaqueous electrolyte battery was obtained in the same manner as in Example 1, except that the concentration of the phase-separation agent in the coating liquid and the concentration of water in the coagulation liquid were changed as in Table 1, and also that the porous substrate 1 was changed to a polyethylene microporous membrane having a thickness of 9 μm, a Gurley number of 128 sec/100 cc, and a porosity of 57% (porous substrate 2).

Examples 4 and 5

Separators for a nonaqueous electrolyte battery of Examples 4 and 5 were obtained in the same manner as in Example 1, except that the temperature of the coagulation liquid was changed as in Table 1.

Examples 6 to 8

Separators for a nonaqueous electrolyte battery of Examples 6 to 8 were obtained in the same manner as in Example 1, except that the weight average molecular weight of the polyvinylidene fluoride resin, the concentration of water in the coagulation liquid, and the temperature of the coagulation liquid were changed as in Table 1.

Comparative Examples 1 and 2

Separators for a nonaqueous electrolyte battery of comparative examples 1 and 2 were obtained in the same manner as in Example 1, except that the concentration of the phase-separation agent in the coating liquid, the concentration of water in the coagulation liquid, and the temperature of the coagulation liquid were changed as in Table 1, and also that the porous substrate 1 was changed to the porous substrate 2.

Comparative Example 3

A separator for a nonaqueous electrolyte battery of comparative example 3 was obtained in the same manner as in Example 1, except that the concentration of the phase-separation agent in the coating liquid, the concentration of water in the coagulation liquid, and the temperature of the coagulation liquid were changed as in Table 1.

TABLE 1

| | Porous Substrate $\varphi_B$ | Separator | | | | | | | | |
|---|---|---|---|---|---|---|---|---|---|---|
| | | Adhesive Resin | | Coating Liquid Phase-Separation Agent Concentration | Coagulation Liquid | | | | | Gurley Number |
| | | | | | Water Concentration | Temperature | $\epsilon$ | $\varphi_S$ | $\Delta\varphi$ | |
| | μm | Kind | MW | mass % | mass % | ° C. | — | μm | μm | sec/100 cc |
| Example 1 | 0.031 | PVDF | 1,950,000 | 30 | 57 | 40 | 0.19 | 0.035 | 0.004 | 218 |
| Example 2 | 0.031 | PVDF | 1,950,000 | 35 | 54 | 20 | 0.24 | 0.020 | 0.011 | 318 |
| Example 3 | 0.061 | PVDF | 1,950,000 | 10 | 70 | 40 | 0.39 | 0.100 | 0.039 | 181 |
| Example 4 | 0.031 | PVDF | 1,950,000 | 30 | 57 | 20 | 0.13 | 0.031 | 0.000 | 237 |
| Example 5 | 0.031 | PVDF | 1,950,000 | 30 | 57 | 50 | 0.36 | 0.040 | 0.009 | 201 |
| Example 6 | 0.031 | PVDF | 300,000 | 35 | 60 | 20 | 0.35 | 0.070 | 0.039 | 195 |
| Example 7 | 0.031 | PVDF | 1,000,000 | 30 | 55 | 40 | 0.18 | 0.058 | 0.027 | 240 |
| Example 8 | 0.031 | PVDF | 3,000,000 | 20 | 45 | 30 | 0.15 | 0.020 | 0.011 | 320 |
| Comparative Example 1 | 0.061 | PVDF | 1,950,000 | 35 | 54 | 20 | 2.40 | 0.019 | 0.042 | 278 |
| Comparative Example 2 | 0.061 | PVDF | 1,950,000 | 10 | 70 | 50 | 0.20 | 0.150 | 0.089 | 228 |

TABLE 1-continued

| | Porous Substrate $\varphi_B$ | Adhesive Resin | | Coating Liquid Phase-Separation Agent Concentration | Coagulation Liquid Water Concentration | Temperature | $\epsilon$ | $\varphi_S$ | $\Delta\varphi$ | Gurley Number |
|---|---|---|---|---|---|---|---|---|---|---|
| | μm | Kind | MW | mass % | mass % | °C. | — | μm | μm | sec/100 cc |
| Comparative Example 3 | 0.031 | PVDF | 1,950,000 | 10 | 70 | 20 | 0.70 | 0.040 | 0.009 | 208 |

[Production of Nonaqueous Electrolyte Battery]

Using the separators produced in Examples 1 to 8 and Comparative Examples 1 to 3, nonaqueous electrolyte batteries were produced as follows.

(Production of Negative Electrode)

300 g of artificial graphite as a negative electrode active material, 7.5 g of an aqueous dispersion containing 40 mass % a modified styrene-butadiene copolymer as a binder, 3 g of carboxymethyl cellulose as a thickener, and an appropriate amount of water were stirred in a double-arm mixer to prepare a slurry for a negative electrode. The slurry for a negative electrode was applied to a copper foil having a thickness of 10 μm as a negative electrode collector, dried, and then pressed to give a negative electrode having a negative electrode active material layer.

(Production of Positive Electrode)

89.5 g of a lithium cobalt oxide powder as a positive electrode active material, 4.5 g of acetylene black as an electrically conductive auxiliary, and 6 g of polyvinylidene fluoride as a binder were dissolved in N-methyl-pyrrolidone (NMP) to a polyvinylidene fluoride concentration of 6 mass %, and stirred in a double-arm mixer to prepare a slurry for a positive electrode. The slurry for a positive electrode was applied to an aluminum foil having a thickness of 10 μm as a positive electrode collector, dried, and then pressed to give a positive electrode having a positive electrode active material layer.

(Production of Battery)

A lead tab was welded to the positive electrode and the negative electrode. The positive and negative electrodes were joined together via a separator, impregnated with an electrolyte, and enclosed in an aluminum pack using a vacuum sealer. As the electrolyte, 1 M LiPF$_6$ ethylene carbonate/ethylmethyl carbonate (mass ratio: 3/7) was used. Using a hot press, under a load of 20 kg per cm$^2$ of electrode, the aluminum pack was hot-pressed at 90° C. for 2 minutes to produce a test battery.

[Load Characteristic Test]

In the load characteristic test, nonaqueous electrolyte batteries produced as above were used. Discharge capacity at 2 C relative to the standard discharge capacity at 0.2 C was measured at 25° C. and used as an index of battery load characteristics. The results are shown in Table 2.

[Charge-Discharge Cycle Test]

In the charge-discharge cycle test, nonaqueous electrolyte batteries produced as above were used. The charging condition was constant-current constant-voltage charging at 1 C and 4.2 V, while the discharging condition was constant-current discharging at 1 C to 2.75 V cut-off, and cycle characteristics were thus tested. Here, capacity retention after 100 cycles was used as an index of cycle characteristics. The results are shown in Table 2.

[Check for Adhesion to Electrodes]

The batteries after the charge-discharge cycle test were disassembled and checked for separator-electrode adhesion. The adhesion was checked in terms of adhesion strength and uniformity. The results are shown in Table 2. Incidentally, with respect to adhesion strength, the electrode surface on the positive-electrode side and the electrode surface on the negative-electrode side were each evaluated relative to peel strength in the case of using the separator of Example 1 as 100.

With respect to adhesion uniformity, the positive-electrode side and the negative-electrode side were each evaluated based on the following evaluation criteria from the degree of attachment of the adhesive porous layer on the electrode surface after a peel test.

—Evaluation Criteria (Uniformity)—

A: Almost the entire adhesive porous layer remained attached to the electrode surface [uniformity is good].

B: Most of the adhesive porous layer remained attached to the electrode surface, but the layer was partially broken [uniformity is fair].

C: Most of the adhesive porous layer did not remain attached to the electrode surface, and the layer was significantly broken [uniformity is poor].

Incidentally, peel strength upon the separation of the electrode surface from the adhesive porous layer was determined as follows. That is, using a tensile tester (RTC-1225A manufactured by A&D Company), a peel test was performed by pulling in the pulling directions: 90° relative to one side of the separator and 90° to the other side. By this peel test, the loads required to separate the separator from the electrode surfaces on the positive-electrode side and the negative-electrode side were each measured to determine the peel strength.

TABLE 2

| | Separator Physical Properties | | | Results of Load Characteristic Test % | Results of Charge-Discharge Cycle Test % | Check for Adhesion to Electrodes | | | |
|---|---|---|---|---|---|---|---|---|---|
| | | | | | | Positive Electrode | | Negative Electrode | |
| | $\epsilon$ — | $\varphi_S$ μm | $\Delta\varphi$ μm | | | Adhesion Strength | Uniformity | Adhesion Strength | Uniformity |
| Example 1 | 0.19 | 0.035 | 0.004 | 94 | 91 | 100 | A | 100 | A |
| Example 2 | 0.24 | 0.020 | 0.011 | 93 | 92 | 105 | A | 102 | A |

TABLE 2-continued

| | Separator Physical Properties | | | Results of Load Characteristic Test % | Results of Charge-Discharge Cycle Test % | Check for Adhesion to Electrodes | | | |
|---|---|---|---|---|---|---|---|---|---|
| | | | | | | Positive Electrode | | Negative Electrode | |
| | ε — | $\varphi_S$ μm | Δφ μm | | | Adhesion Strength | Uniformity | Adhesion Strength | Uniformity |
| Example 3 | 0.39 | 0.100 | 0.039 | 94 | 89 | 87 | B | 83 | B |
| Example 4 | 0.13 | 0.031 | 0.000 | 96 | 92 | 99 | A | 98 | A |
| Example 5 | 0.36 | 0.040 | 0.009 | 91 | 89 | 96 | A | 93 | A |
| Example 6 | 0.35 | 0.070 | 0.039 | 91 | 87 | 85 | B | 82 | B |
| Example 7 | 0.18 | 0.058 | 0.027 | 92 | 90 | 94 | A | 95 | A |
| Example 8 | 0.15 | 0.020 | 0.011 | 93 | 92 | 101 | A | 103 | A |
| Comparative Example 1 | 2.40 | 0.019 | 0.042 | 68 | 67 | 106 | C | 103 | C |
| Comparative Example 2 | 0.20 | 0.150 | 0.089 | 90 | 62 | 56 | C | 39 | C |
| Comparative Example 3 | 0.70 | 0.040 | 0.009 | 88 | 71 | 78 | C | 71 | C |

As is obvious from Table 2, the value of adhesion strength between a separator and electrodes is high in Examples 1 to 8, Comparative Example 1, and Comparative Example 3, but is significantly small in Comparative Example 2. This is greatly affected by the bonding area to electrodes. It can be seen that the smaller the surface pore size of a porous layer, the higher the adhesion to electrodes. However, in Comparative Example 2 where the surface pore size is large, the results show that adhesion strength is slightly inferior. From the above discussion, it is believed that the pore size range of the invention is advantageous in terms of adhesion to electrodes.

In terms of the uniformity of adhesion to electrodes, when the surface pore size of a separator is uniform, the adhesion is also uniform. However, in the separators of Comparative Example 1 and Comparative Example 3 where E is large, although high adhesion was seen in some parts, other parts had weak adhesion. Thus, they are inferior in terms of uniformity.

From the above discussion, it is believed that the pore size distribution range ε of the invention, 0.4 or less, is important in terms of the uniformity of adhesion to electrodes.

The invention claimed is:

1. A separator for a nonaqueous electrolyte battery, consisting of a composite membrane comprising:
   a porous substrate; and
   an adhesive porous layer that is provided on at least one side of the porous substrate and contains an adhesive resin,
   in the pore size distribution of the composite membrane measured by a pore size distribution measurement test: using a half-dry method (ASTM E1294-89) using a capillary flow porometer and using perfluoropolyester as a test solution,
   the pore size at the maximum value of the maximum peak being within a range of 0.02 μm to 0.1 μm,
   the pore size distribution range value ε defined as follows being 0.39 or less:
   pore size distribution range value ε: a value calculated by the following equation from a pore size D90 corresponding to a cumulative pore size distribution of 90%, a pore size D10 corresponding to a cumulative pore size distribution of 10%, and a pore size D50 corresponding to a cumulative pore size distribution of 50%:

$\epsilon=(D90-D10)/D50$.

2. The separator for a nonaqueous electrolyte battery according to claim 1, wherein the difference between the pore size at the maximum value of the maximum peak of the separator and the pore size at the maximum value of the maximum peak in the pore size distribution of the porous substrate measured using the pore size distribution measurement test is 0.04 μm or less.

3. The separator for a nonaqueous electrolyte battery according to claim 1, wherein the adhesive resin is a polyvinylidene fluoride resin.

4. The separator for a nonaqueous electrolyte battery according to claim 3, wherein the polyvinylidene fluoride resin has a weight average molecular weight of 300,000 or more and 3,000,000 or less.

5. A nonaqueous electrolyte battery comprising:
   a positive electrode;
   a negative electrode; and
   the separator for a nonaqueous electrolyte battery of claim 1 disposed between the positive electrode and the negative electrode,
   an electromotive force thereof being obtained by lithium doping/dedoping.

6. The separator for a nonaqueous electrolyte battery according to claim 2, wherein the adhesive resin is a polyvinylidene fluoride resin.

7. The separator for a nonaqueous electrolyte battery according to claim 6, wherein the polyvinylidene fluoride resin has a weight average molecular weight of 300,000 or more and 3,000,000 or less.

8. A nonaqueous electrolyte battery comprising:
   a positive electrode;
   a negative electrode; and
   the separator for a nonaqueous electrolyte battery of claim 2 disposed between the positive electrode and the negative electrode,
   an electromotive force thereof being obtained by lithium doping/dedoping.

9. A nonaqueous electrolyte battery comprising:
   a positive electrode;
   a negative electrode; and
   the separator for a nonaqueous electrolyte battery of claim 3 disposed between the positive electrode and the negative electrode,
   an electromotive force thereof being obtained by lithium doping/dedoping.

10. A nonaqueous electrolyte battery comprising:
a positive electrode;
a negative electrode; and
the separator for a nonaqueous electrolyte battery of claim 4 disposed between the positive electrode and the negative electrode,
an electromotive force thereof being obtained by lithium doping/dedoping.

11. A nonaqueous electrolyte battery comprising:
a positive electrode;
a negative electrode; and
the separator for a nonaqueous electrolyte battery of claim 6 disposed between the positive electrode and the negative electrode,
an electromotive force thereof being obtained by lithium doping/dedoping.

12. A nonaqueous electrolyte battery comprising:
a positive electrode;
a negative electrode; and
the separator for a nonaqueous electrolyte battery of claim 7 disposed between the positive electrode and the negative electrode,
an electromotive force thereof being obtained by lithium doping/dedoping.

* * * * *